United States Patent [19]

Tobias, Jr. et al.

[11] Patent Number: 4,972,479
[45] Date of Patent: Nov. 20, 1990

[54] METHOD AND APPARATUS FOR PROVIDING PRIVACY/SECURITY IN A COMMUNICATION SYSTEM

[76] Inventors: Ray W. Tobias, Jr., 7 Hilltop Dr., New Freedom, Pa. 17349; Alerick R. Beaman, 10 Circle Dr., Screwsbury, Pa. 17361; Steven S. Edwards, 7411 Inwood Ave., Baltimore, Md. 21228

[21] Appl. No.: 72,157

[22] Filed: Jul. 10, 1987

[51] Int. Cl.$^5$ .............................................. H04K 1/10
[52] U.S. Cl. ........................................ 380/33; 380/31; 380/9; 379/62; 379/58; 455/54
[58] Field of Search ...................... 379/62, 58; 380/31, 380/33, 34, 9; 455/54

[56] References Cited

U.S. PATENT DOCUMENTS

| | | | |
|---|---|---|---|
| 4,256,928 | 3/1981 | Lesea et al. ........................ | 379/247 |
| 4,411,017 | 10/1983 | Talbot . | |
| 4,549,308 | 10/1985 | LoPinto . | |
| 4,555,805 | 11/1985 | Talbot ................................. | 380/31 |

OTHER PUBLICATIONS

Rothblatt, "Radiodetermination Satellite Service," Telecommunications—Jun. 1987.
Morley, "Mobile-Satellite Service: An Update," Telecommunications—Jun. 1987.
Olsen—"Cellular Security: Push or Pull?," Cellular Business, Jun. 1987.
An Overview of Cellular Radio, DataPro Research Corp.,—Jul. 1985.

Primary Examiner—Thomas H. Tarcza
Assistant Examiner—David Cain
Attorney, Agent, or Firm—Finnegan, Henderson, Farabow, Garrett & Dunner

[57] ABSTRACT

Apparatus and methods are disclosed for providing privacy on communications systems which include radio links, such as cellular telephone, marine radiotelephone, IMTS, and RDSS systems, in a manner which does not require a scrambler/descrambler at each called party location. The apparatus includes a base module having a call diverter connected to the public switched telephone network through two standard telephone lines. A bypass interface circuit is connected to the call diverter between the connections to the two telephone lines to selectively connect a scrambler/descrambler in series with the two telephone lines.

In operation, a mobile telephone, such as a cellular telephone, places a call to the telephone number of the first telephone line to cause the call diverter to place the second line off-hook and supply a dial tone from the second line through the call diverter and the first line back to the cellular telephone. The cellular telephone then dials the number of the desired called party to establish a communications path. The cellular telephone causes the call diverter to connect the scrambler/descrambler in series with the communications path and activates a scrambler/descrambler at the cellular telephone location to provide privacy against unauthorized monitoring of the radio link, without requiring a scrambler/descrambler unit at the called party location.

22 Claims, 7 Drawing Sheets

METHOD AND APPARATUS FOR PROVIDING PRIVACY/SECURITY IN A COMMUNICATION SYSTEM

BACKGROUND OF THE INVENTION

The invention relates to communications systems and, more particularly, to communications systems including radio transmission links.

Recent developments in the regulatory environment and in computer and communications circuit technology have brought great advances in personal and business communications. Significant changes have occurred in existing services, as a multitude of companies enter the long distance telephone market in competition with American Telephone and Telegraph, Inc. and as improved marine radiotelephone service and public telephone service in airplanes and trains have become available. Moreover, entirely new services are also now available to communications users, including cellular telephone service and radio determination satellite service (RDSS).

Such new and improved services provide valuable benefits to communications users. However, many such services have significant shortcomings in protecting the privacy of conversations carried over the service. For example, it is well known that marine radiotelephone circuits can be easily monitored by all other marine radiotelephone users, as well as by owners of scanning receivers readily available on the consumer market. It is not so widely known that cellular telephone communications are also readily receivable on scanning receivers as well as on many older television receivers having the capability to tune through channel 82 of the UHF band. It is also less widely known that many long distance telephone calls placed over standard long distance carriers travel at some point over radio links such as satellite circuits and terrestrial microwave relay circuits. A microwave receiver placed in the line of sight of such circuits, either between the stations of a circuit or directly behind one of the stations, can easily monitor the content of communications over such circuits.

Existing techniques are known for providing privacy over communications circuits which incorporate radio links. For example, scrambler/descrambler units are commercially available and can be added to cellular telephones and standard telephones communicating with cellular telephones. Such systems do not require interconnection to telephone company equipment, but limit privacy calls to those fixed telephone stations which are equipped with scrambler/descrambler units.

Other systems using sophisticated encryption technology allow calls to be placed from a cellular telephone to any fixed telephone, without requiring each called telephone to be equipped with a descrambler. Such a system is described, for example, in U.S. Pat. No. 4,549,308 to LoPinto. However, such systems require interconnection and modification to telephone company equipment and thus provide little flexibility for the user.

It is desirable to provide a method and apparatus for ensuring privacy of communications over circuits having radio links. It is also desirable to provide a method and apparatus to allow privacy for calls placed from a mobile telephone to any called telephone, without requiring additional equipment to be located at each called telephone. It is further desirable to provide the above-mentioned capabilities with minimum modification of equipment owned by the telephone company or other common carriers. It is also desirable to provide the capability to insure a selectable level of privacy in communication consistent with the confidentiality of information conveyed and financial resources available.

SUMMARY OF THE INVENTION

Objects and advantages of the invention will be set forth in part in the description which follows and in part will be obvious from the description, or may be learned by practice of the invention. Such objects and advantages may be realized and attained by means of the instrumentalities and combinations particularly pointed out in the appended claims.

The present invention overcomes the problems and disadvantages of the prior art by providing scrambler/descrambler equipment which requires minimum modification to existing equipment owned by the telephone company or the cellular telephone company. Moreover, apparatus embodying the invention may be owned and controlled by a communications system user and located on his property. Such apparatus may be connected to telephone company equipment solely through the use of standard subscriber telephone lines.

To achieve the objects and in accordance with the purpose of the invention, as embodied and broadly described herein, there is provided communications system privacy apparatus adapted for coupling to first and second communications channels. The apparatus comprises diverter means for establishing a communications path between the first and second channels in response to signals received over the channels. The apparatus further comprises encryption means having first and second terminals for encrypting signals received from the second terminal and supplying the encrypted signals to the first terminal, and for decrypting signals received from the first terminal and supplying the decrypted signals to the second terminal. Finally, the apparatus includes coupling means responsive to an activation signal for selectively connecting the encryption means to the diverter means such that the first terminal is connected to the first channel and the second terminal is connected to the second channel, whereby encrypted signals received from the first channel are transmitted in decrypted form over the second channel and signals received from the second channel are transmitted over the first channel in encrypted form.

In another aspect, the invention provides a method for providing privacy in a communications system having first and second channels. The method comprises the steps of receiving a first activation signal over one of the channels, accepting communications signals from the one channel in response to the first activation signal, establishing a communications path between the first channel and the second channel in response to communications received over the one channel, and selectively inserting an encryption/decryption circuit in the communications path in response to communications signals received over the channels. The method includes the final step of decrypting encrypted communications signals received over the first channel and transmitting the decrypted signals over the second channel, and encrypting communications signals received over the second channel and transmitting the encrypted second channel signals over the first channel.

In yet another aspect, the invention provides communications system security apparatus adapted for coupling to first, second, and third communications channels. The apparatus comprises first diverter means for establishing a communications path between the first and second channels in response to signals received over one of the first and second channels, second diverter means for establishing a communications path between the second and third channels in response to signals received over one of the second and third channels, and first and second encryption means each having first and second terminals for encrypting signals received from the second terminal and supplying the encrypted signals to the first terminal and for decrypting signals received from the first terminal and supplying the decrypted signals to the second terminal. In this aspect, the invention further includes first coupling means responsive to an activation signal for selectively connecting the first encryption means to the first diverter means such that the first encryption means first terminal is connected to the first channel and the first encryption means second terminal is connected to the second channel. Finally, the invention includes second coupling means responsive to an activation signal for selectively connecting the second encryption means to the second diverter means such that the second encryption means second terminal is connected to the third channel and the second encryption means first terminal is connected to the second channel, whereby signals received by the apparatus from the first channel are transmitted in encrypted form over the second channel and retransmitted in decrypted form over the third channel, and whereby signals received by the apparatus from the third channel are transmitted in encrypted form over the second channel and retransmitted in decrypted form over the first channel.

The accompanying drawings, which are incorporated in and constitute a part of this specification, illustrate embodiments of the invention, and, together with the description, serve to explain the principles of the present invention.

DETAILED DESCRIPTION OF THE PREFERRED EMBODIMENT

Reference will now be made in detail to preferred embodiments of the invention, examples of which is illustrated in the accompanying drawings. Throughout the description, like elements will be referred to by corresponding reference numbers.

Figure 1:
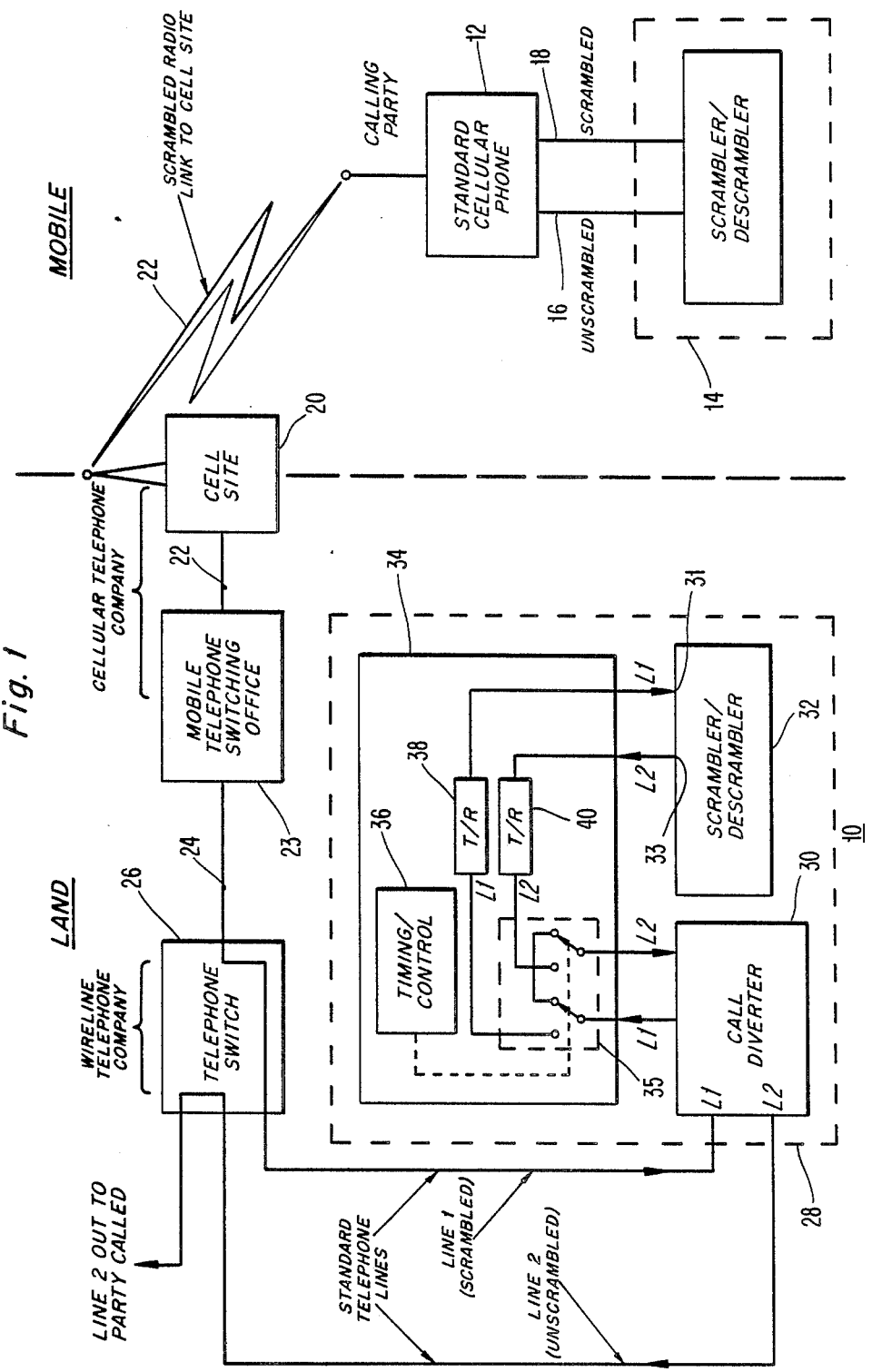
FIG. 1 is a block diagram of a communications system incorporating a preferred embodiment of the present invention.

FIG. 1 shows a cellular telephone system 10 incorporating a preferred embodiment of the present invention. System 10 includes a plurality of standard cellular telephones, such as cellular telephone 12. Cellular telephone 12 may be, for example, a Model 760 cellular mobile telephone commercially available from the Motorola Corporation of Schaumburg, Ill. As is well known to those skilled in the art, cellular telephone 12 includes a telephone handset connected to a dual tone multifrequency (DTMF) push-button dialing unit, radio transmitter and receiver circuitry, and associated control circuitry. Cellular telephone 12 is generally located in a vehicle, but may be also configured as a portable hand-held unit.

As can be seen in FIG. 1, cellular telephone 12 is connected to a scrambler/descrambler unit 14 by lines 16 and 18. Scrambler/descrambler 14 may be, for example, a Model 1905 M frequency inverting scrambler/descrambler unit commercially available from Cellular One of Greenbelt, Md.

Cellular telephone 12 communicates with a standard cellular telephone system cell site 20 over a bidirectional radio link indicated schematically at 22. Cell site 20 includes transmitting and receiving circuitry to permit full duplex communication with cellular telephone 12. Cell site 20 is connected to a mobile telephone switching office 23 by well-known means 22 such as leased four-wire telephone lines, fiber optic cable, or microwave links. Mobile telephone switching office 23 provides connections from the cellular system to the public switched telephone network by well known means 24 (which again may be leased four-wire telephone lines, fiber optic cable, etc.) and the local telephone company central office switch 26.

In the preferred embodiment, the present invention provides communications system privacy apparatus including a base module 28 adapted for coupling to first and second communications channels. As embodied herein, the first and second communications channels comprise standard two-wire telephone lines L1 and L2 connected to switch 26. Lines L1 and L2 are each assigned telephone numbers in the same manner as all standard telephone lines.

The invention includes diverter means for establishing a communications path between the first and second channels in response to signals received over the channels. As embodied herein, such diverter means comprises a call diverter 30. The invention also includes encryption means having first and second terminals for encrypting signals received from the second terminal and supplying the encrypted signals to the first terminal, and for decrypting signals received from the first terminal and supplying the decrypted signals to the second terminal. As embodied herein, such encryption means comprises a scrambler/descrambler unit 32 having a first terminal 31 and a second terminal 33. Scrambler/descrambler unit 32 may be, for example, a Model 1905 B frequency inverting scrambler/descrambler unit commercially available from Cellular One of Greenbelt, Md.

The invention further includes coupling means responsive to an activation signal for selectively connecting the encryption means to the diverter means such that the first terminal is connected to the first channel and the second terminal is connected to the second channel, whereby encrypted signals received from the first channel are transmitted in decrypted form over the second channel and signals received from the second channel are transmitted over the first channel in encrypted form. As embodied herein, such coupling means comprises a bypass and interface circuit 34. Preferably, the coupling means is operable between a first mode in which the encryption means is isolated from the communications path and a second mode in which the encryption means is connected in series with the communications path.

Figure 2A:
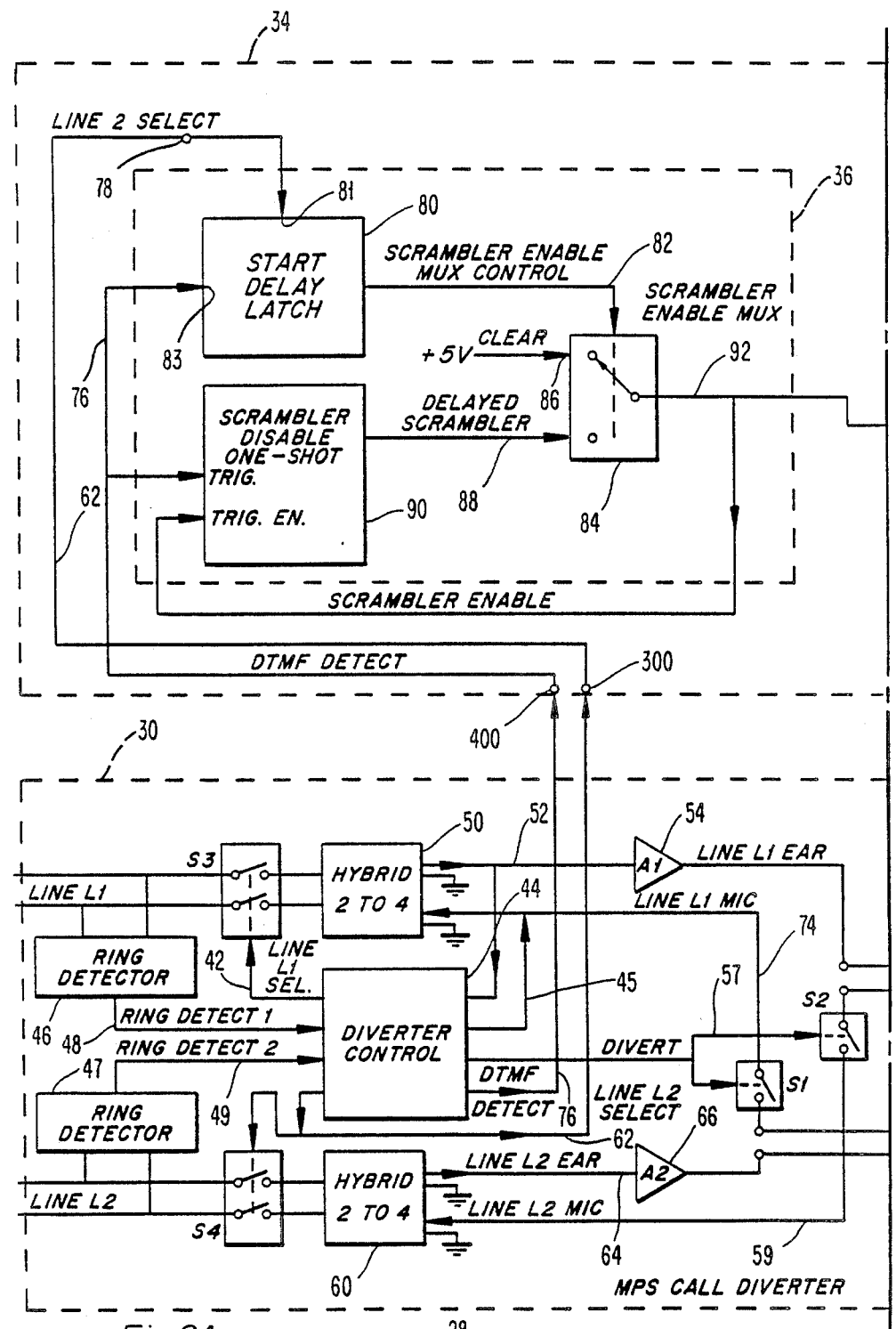
FIGS. 2A and 2B are more detailed block diagrams of the embodiment of the invention shown in FIG. 1.

In a manner to be described below in greater detail, lines L1 and L2 are connected through call diverter 30 to a bypass multiplexer 35. Preferably, the diverter means includes DTMF detection means for generating a DTMF DETECT signal in response to the presence of DTMF signals on the communications path. As embodied herein, the DTMF detection means comprises a diverter control circuit 44 (FIG. 2A).

Preferably, the coupling means includes means for maintaining the coupling means in the first mode during the presence of DTMF signals on the communications path. The maintaining means, as embodied herein, comprises a timing/control circuit 36 which controls bypass multiplexer 35. Bypass multiplexer 35 has a first position in which scrambler/descrambler unit 32 is connected in series with a communications path from line L1 through call diverter 30, scrambler/descrambler 32, call diverter 30, and line L2. In a second position, bypass multiplexer 35 isolates scrambler/descrambler 32 from the communications path. When scrambler/descrambler 32 is connected in series in the communications path by bypass multiplexer 35, bidirectional full duplex communication is provided by transmit/receive circuits 38, 40.

An overview of the operation of system 10 including base module 28 will now be provided. A user initiates a telephone call from cellular telephone 12 in the normal manner, and dials the telephone number associated with telephone line L1. A circuit is thus established from cellular telephone 12 over radio link 22 to cell site 20, and thence through cable 22, mobile telephone switching office 23, cable 24, and telephone switch 26 to line L1 to cause generation of a ringing signal on line L1. Call diverter 30 recognizes the ringing signal on line L1 and places line L1 in an off-hook condition, that is, call diverter 30 "answers" line L1.

At this point, call diverter 30 may optionally generate an access code request tone, which is transmitted over line L1 to cellular telephone 12, to invite the user to transmit an access code using the DTMF dialing unit of cellular telephone 12. The DTMF tones constituting the transmitted access code are supplied to call diverter 30 and, if the transmitted access code matches an access code programmed into call diverter 30, line L2 is placed in an off-hook condition and line L1 is connected to line L2 by call diverter 30. If the transmitted access code does not match the access code programmed in call diverter 30, call diverter 30 places line L1 in an on-hook condition, that is, call diverter 30 "hangs up" on line L1, thereby terminating the call placed by cellular telephone 12. It is to be noted that the use of an access code is optional, and call diverter 30 may unconditionally place line L2 in an off-hook condition and connect line L1 to line L2 when line L1 is placed off-hook.

When line L2 is placed in an off-hook condition by call diverter 30, a dial tone is generated by telephone switch 26. This dial tone is received by call diverter 30 over line L2 and is transmitted back over line L1 through telephone switch 26, mobile telephone switching office 23, and cell site 20 to cellular telephone 12. When the user receives the dial tone from line L2 over cellular telephone 12, the user dials any desired telephone number to place a call to any desired telephone which is accessible through the switched public telephone network.

So long as line L2 remains on-hook, timing/control circuit 36 of circuit 34 causes multiplexer 35 to be placed in a position in which scrambler/descrambler 32 is not inserted. Circuit 36 recognizes the presence of dialing signals on line L1 generated by cellular telephone 12. After line L2 is placed off-hook, circuit 36 causes multiplexer 35 to remain in a position bypassing scrambler/descrambler 32 while dialing signals are being supplied and for a predetermined delay time thereafter. At the expiration of the delay time, circuit 36 activates multiplexer 35 to cause scrambler/descrambler 32 to be placed in the communications path. The user then activates scrambler/descrambler 14 connected to cellular telephone 12 to transmit encrypted signals over radio link 22 to cell site 20, mobile telephone switching office 23, telephone switch 26, and base module 28. The encrypted signals from line L1 are decrypted by scrambler/descrambler 32 and retransmitted in a decrypted form over line L2 to the called party.

Instead of inserting scrambler/descrambler 32 on the basis of DTMF dialing signals, scrambler/descrambler 32 may be selectively connected in the communications path by other signals. For example, a sequence of DTMF signals could be generated as a connect code to insert both scrambler/descrambler units 14 and 32 in the communications path. Alternatively, with appropriate scrambler/descrambler design, either party could operate either scrambler/descrambler 14 or 32 to generate a signal which would connect both scrambler/descramblers 14 and 32 into the communications path.

In a similar manner, unencrypted signals from the called party pass through telephone switch 26 over line L2 to base module 28. The unencrypted signals from line L2 are encrypted by scrambler/descrambler 32 and retransmitted in encrypted form over line L1, telephone switch 26, mobile telephone switching office 23, cell site 20, and radio link 22 to cellular telephone 12. The encrypted signals are then passed through scrambler/descrambler 14 where they are decrypted and supplied to the user.

In this manner, only encrypted signals pass over the radio link 22, thus ensuring the privacy of a conversation between the calling party using cellular telephone 12 and the called party at any location accessible by the public switched telephone network, without requiring the called party to have a descrambler associated with his telephone. Moreover, connection to telephone company and common carrier equipment is solely through standard telephone lines.

Figure 2B:
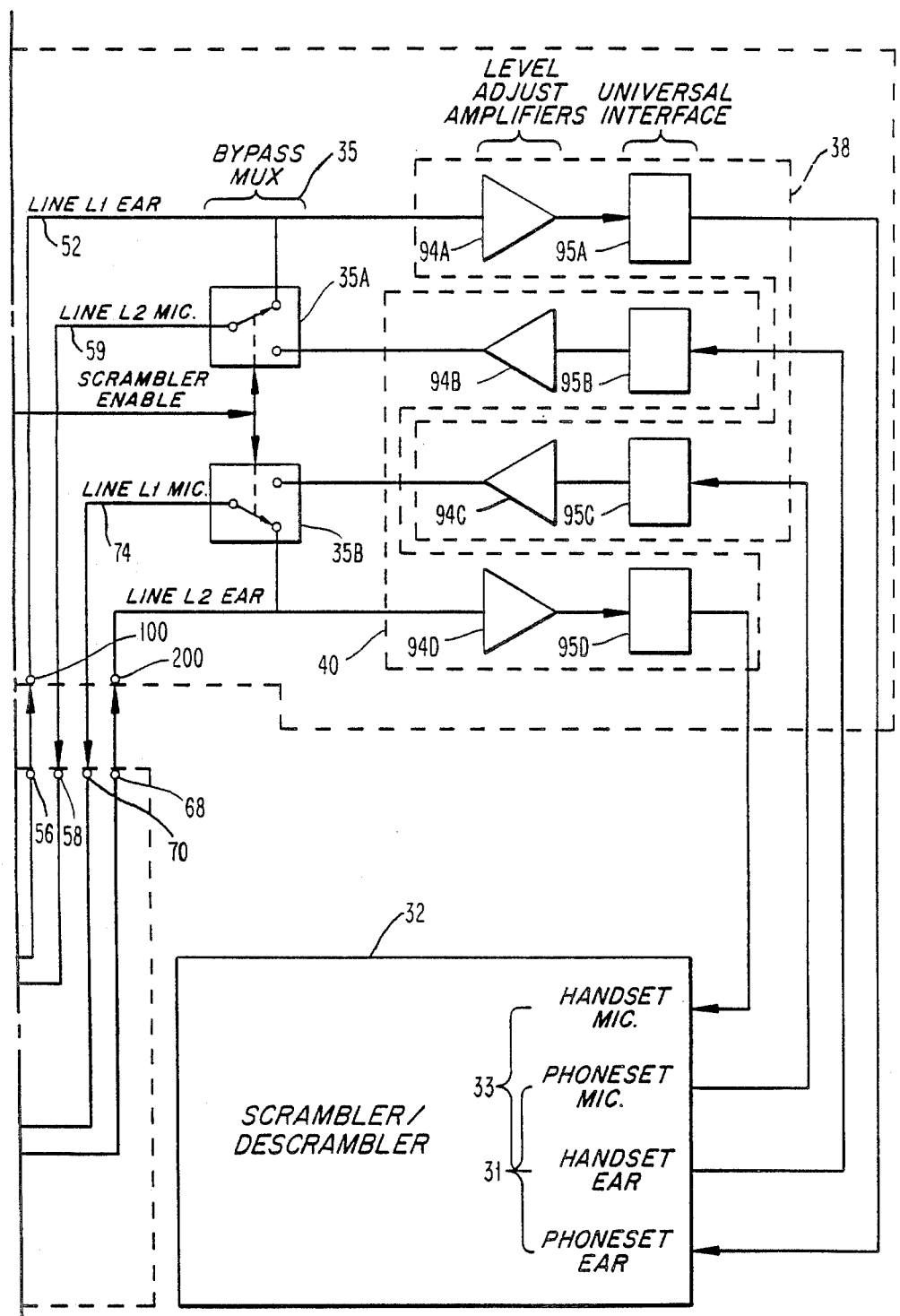

Referring now to FIGS. 2A and 2B, base module 28 is shown in greater detail. Line L1, a standard two-wire telephone line such as commonly supplied to any residence or business to provide standard telephone service, is connected to call diverter 30. In the preferred embodiment, call diverter 30 comprises a model 2597 programmable call diverter commercially available from the Code-A-Phone Corporation of Portland, Oregon. Additional information on the programming and operation of the model 2597 call diverter is contained in the Model 2597 Service Manual Document #9970660 obtainable from the Code A-Phone Corporation.

Line L1 is connected to a relay S3 under control of a LINE L1 SELECT signal 42 generated by diverter control circuit 44. A ring detector circuit 46 is connected to line L1. Ring detector circuit 46 is a standard comparator circuit which monitors the voltage level on line L1 and generates a LINE L1 RING DETECT logic signal 48 upon sensing the presence of the 90 volt RMS 16–60 Hz ringing signal. Ring detector circuit 46 may be any standard comparator circuit, the design of which is well within the competence of those of ordinary skill in the art. LINE L1 RING DETECT signal 48 is supplied to diverter control circuit 44.

A similar ring detector circuit 47 is connected to line L2 and supplies a LINE L2 RING DETECT signal 49 to diverter control circuit 44 upon detection of a ringing signal on line L2.

The output of relay S3 is connected to a standard two-wire to four-wire hybrid circuit 50. Hybrid circuit 50 is included to provide the capability for normal full duplex communication over the system. Signals received over line L1 are provided as output by hybrid circuit 50 over a LINE L1 EAR signal line 52. Signals on line 52 are amplified by an audio amplifier 54 of standard construction and connected to an output terminal 56. Signals received over line L1 are supplied to output terminal 56 and then through bypass interface circuit 34 to permit selective interconnection of scrambler/descrambler 32 in a manner to be more completely described hereinafter. Signals received from line L1 are returned from bypass interface circuit 34 over a LINE L2 MIC signal line 59, and are supplied to call diverter 30 at an input terminal 58 connected to one terminal of a relay S2 under control of a DIVERT signal line 57 generated by diverter control circuit 44. Diverter control circuit 44 also produces a DTMF DETECT signal line 76, for use by bypass interface circuit 34.

The other terminal of relay S2 is connected over a continuation of line 59 to one of the four-wire terminals of a second two-wire to four-wire hybrid circuit 60. LINE L2 MIC signals are passed through hybrid circuit 60 to a relay S4 for retransmission over line L2. Relay S4 is controlled by a LINE L2 SELECT signal line 62 generated by diverter control circuit 44.

Signals received from line L2 are passed through relay S4 and hybrid circuit 60 to form a LINE L2 EAR signal on a line 64. Signals on line 64 are passed through a standard audio amplifier 66 and an output terminal 68 to bypass interface circuit 34 for use in connection with the selective interconnection of scrambler/descrambler 32. LINE L2 EAR signals are returned from bypass interface circuit 34 as LINE L1 MIC signals through an input terminal 70 which is connected to one terminal of a relay S1, also under control of DIVERT signal line 57. The other terminal of relay S1 is connected to a line 74. Signals on line 74 are passed through hybrid circuit 50 and relay S3 for retransmission over line L1.

In bypass interface circuit 34, LINE L2 SELECT signal line 62 is supplied to timing/control circuit 36. Preferably, circuit 36 includes means for causing the multiplexer circuit to switch said coupling means to the second mode a predetermined time after detection of a DTMF signal on said communications path As embodied herein, such means comprises a start delay latch 80, a scrambler disable one-shot circuit 90, and a scrambler enable multiplexer 84. Signal 62 is supplied through an inverter 78 to a first terminal 81 of latch 80. DTMF DETECT signal line 76 is supplied to a second terminal 83 of latch 80. The output of latch 80 constitutes a SCRAMBLER ENABLE MULTIPLEX CONTROL signal 82, which controls multiplexer 84. Multiplexer 84 operates to selectively connect either a logic level high signal 86 supplied from the power supply for circuit 34, or a DELAYED SCRAMBLER signal 88, generated by scrambler disable one-shot circuit 90, to the output of multiplexer 84 to constitute a SCRAMBLER ENABLE signal 92. The trigger input of one-shot circuit 90 is connected to DTMF DETECT signal line 76.

SCRAMBLER ENABLE signal 92 is also supplied as the control signal for bypass multiplexer 35 which consists of a pair of multiplexers 35A, 35B. Multiplexers 35A and 35B each include a common terminal and a pair of selected terminals.

Bypass interface circuit 34 also includes four level adjust amplifiers 94A, 94B, 94C, and 94D and four universal interface circuits 95A, 95B, 95C, 95D. As shown in FIG. 2, the selected terminals of multiplexers 35A and 35B are respectively connected to one terminal of amplifiers 94A, 94B, 94C and 94D. The other terminals of amplifiers 94A, 94B, 94C and 94D are respectively connected to one terminal of interface circuits 95A, 95B, 95C, and 95D. The other terminals of interface circuits 95A, 95B, 95C, and 95D are respectively connected to the PHONESET EAR, HANDSET EAR, PHONESET MIC, and HANDSET MIC terminals of scrambler/descrambler unit 32.

As can be seen in FIGS. 2A and 2B, LINE 1 EAR signal line 52 is connected to the input of amplifier 94A and to one selected terminal of multiplexer 35A. LINE L2 MIC signal line 59 is connected to the common terminal of multiplexer 35A. LINE 1 MIC signal line 74 is connected to the common terminal of multiplexer 35B, and LINE 2 EAR signal line 64 is connected to the input of amplifier 94D and to a selected terminal of multiplexer 35B. The operation of call diverter 30, bypass interface circuit 34, and scrambler/descrambler 32 will now be described in greater detail with respect to FIG. 2.

When a call is placed by a user from, for example, cellular telephone 12 (FIG. 1) to the telephone number associated with line L1, a 90 volt RMS, 16 60 Hz ringing signal is supplied by the telephone company switch 26 to line L1. This signal is sensed by ring detector circuit 46 which activates LINE 1 RING DETECT signal 48. Diverter control circuit 44 senses the presence of LINE 1 RING DETECT signal 48 and activates LINE 1 SELECT signal 42 to close relay S3 and place hybrid circuit 50 across line L1. This places line L1 in an off-hook condition. Diverter control circuit 44 also activates LINE L2 SELECT signal line 62. Optionally, diverter control circuit 44 may generate an access code request signal, such as a beep tone, over a line 45 connected to LINE 1 MIC signal line 74. This transmits the access code request signal over line L1 to request the calling party to generate an access code using the DTMF dialing unit at the calling telephone, as described above. Diverter control circuit 44 may then condition the generation of LINE 2 SELECT signal on line 62 upon receipt of the proper access code. After the LINE L1 SELECT signal on line 62 is activated to place line L2 in an off-hook condition, DIVERT signal 57 is activated by diverter control circuit 44 to close relays S1 and S2, thereby connecting line L1 to line L2. Diverter control circuit 44 is thus responsive ring detect signals to establish the communications path through relays S1, S2, S3, and S4 and hybrid circuits 50 and 60 to permit DTMF signals received from either of the channels to be transmitted over the other of the channels.

Prior to activation of the LINE L2 SELECT signal on line 62, a reset signal was continuously generated at terminal 81 of latch 80 due to inverter 78. SCRAMBLER ENABLE MULTIPLEXER CONTROL signal 82 was thus inactive, causing multiplexer 84 to connect logic high signal 86 to SCRAMBLER ENABLE line 92. This placed multiplexers 35A and 35B in the condition shown in FIG. 2 such that LINE 1 EAR signal line 52 was connected to LINE L2 MIC signal line 59 and LINE L2 EAR signal line 64 was connected to LINE 1 MIC signal line 74, thereby bypassing scrambler/descrambler signal 32 and isolating scrambling/descrambler unit 32 from the communications path.

When LINE L2 SELECT signal line 62 is activated, relay S4 places line L2 in an off-hook condition. Telephone company switch 26 (FIG. 1) then generates a dial tone over line L2 which is retransmitted over LINE L2 EAR signal line 64 and LINE 1 MIC signal line 74 to line L1, causing the calling party at cellular telephone 12 to receive the dial tone from line L2. The calling party then dials the number of the desired called telephone using a DTMF dialing unit.

Circuit 90 maintains SCRAMBLER ENABLE signal 92 in a logic high condition to maintain scrambler/descrambler 32 isolated from the communications path until ten seconds after the last DTMF signal from cellular telephone 12. Circuit 90 thus constitutes a timer circuit connected to a selected terminal of multiplexer 84.

In the preferred embodiment using a commercial call diverter, the functions of diverter control circuit 44 are performed by a microprocessor. As will be recognized by those skilled in the art, however, the functions of diverter control circuit 44 could alternatively be implemented in discrete analog and digital circuitry. For example, DTMF DETECT signal 76 could be generated by a standard DTMF decoding circuit such as a type M-957 commercially available from the Teltone Corporation of Kirkland, Wash.

In certain applications, it may be desirable to permit a fixed telephone to place a privacy call to cellular telephone 12 using module 28. Certain modifications are made to the programming of diverter control circuit 44 to provide this capability. Specifically, diverter control circuit 44 is programmed to respond to RING DETECT 2 signal 49 by activating signal LINE L2 SELECT signal 62 to close relay S4 and place line L2 in an off-hook condition. An access code may optionally be requested from the calling party at this time, by generating a distinctive tone on line L2. The user is then expected to transmit an access code by sending a sequence of DTMF signals. These signals are received by diverter control circuit 44, decoded, and compared to data stored in diverter control circuit 44 which represents a sequence of DTMF signals. A positive comparison indicates that a proper access code was transmitted.

If the proper access code is entered or if no access code is requested, diverter control circuit activates LINE L1 SELECT signal 42 to close relay S3 and place line L1 off hook.

Diverter control circuit 44 then generates DTMF dialing signals representing the telephone number of cellular telephone 12 from data previously stored in diverter control circuit 44 and transmits these signals over line L1. This places a call to cellular telephone 12 over line L1. Diverter control circuit 44 then activates DIVERT signal 57 to connect line L1 to line L2. After a delay period following the last DTMF signal generated by diverter control circuit 44, bypass interface circuit 34 connects scrambler/descrambler 32 in series with the communications path of line L1 and line L2.

The user answers cellular telephone 12, engages scrambler/descrambler 14, and both parties converse over the communications path. When either party hangs up, diverter control circuit 44 deactivates signals LINE L1 SELECT 42, LINE L2 SELECT 62, and DIVERT 57 to terminate the call.

It may be desired to permit a fixed telephone to place a call to any party, not only to cellular telephone 12. In this case, a calling party dials the number associated with line L2. Diverter control circuit 44 receives a LINE L2 RING DETECT signal 49 and activates signals LINE L1 SELECT 42, LINE L2 SELECT 62, and DIVERT 57 as described above. A dial tone from line L1 is returned to the calling party. Instead of diverter control circuit 44 generating DTMF signals to dial cellular telephone 12, the calling party generates DTMF signals to dial any desired called party. The call is completed and terminated in the same manner as described above.

Figure 3A:
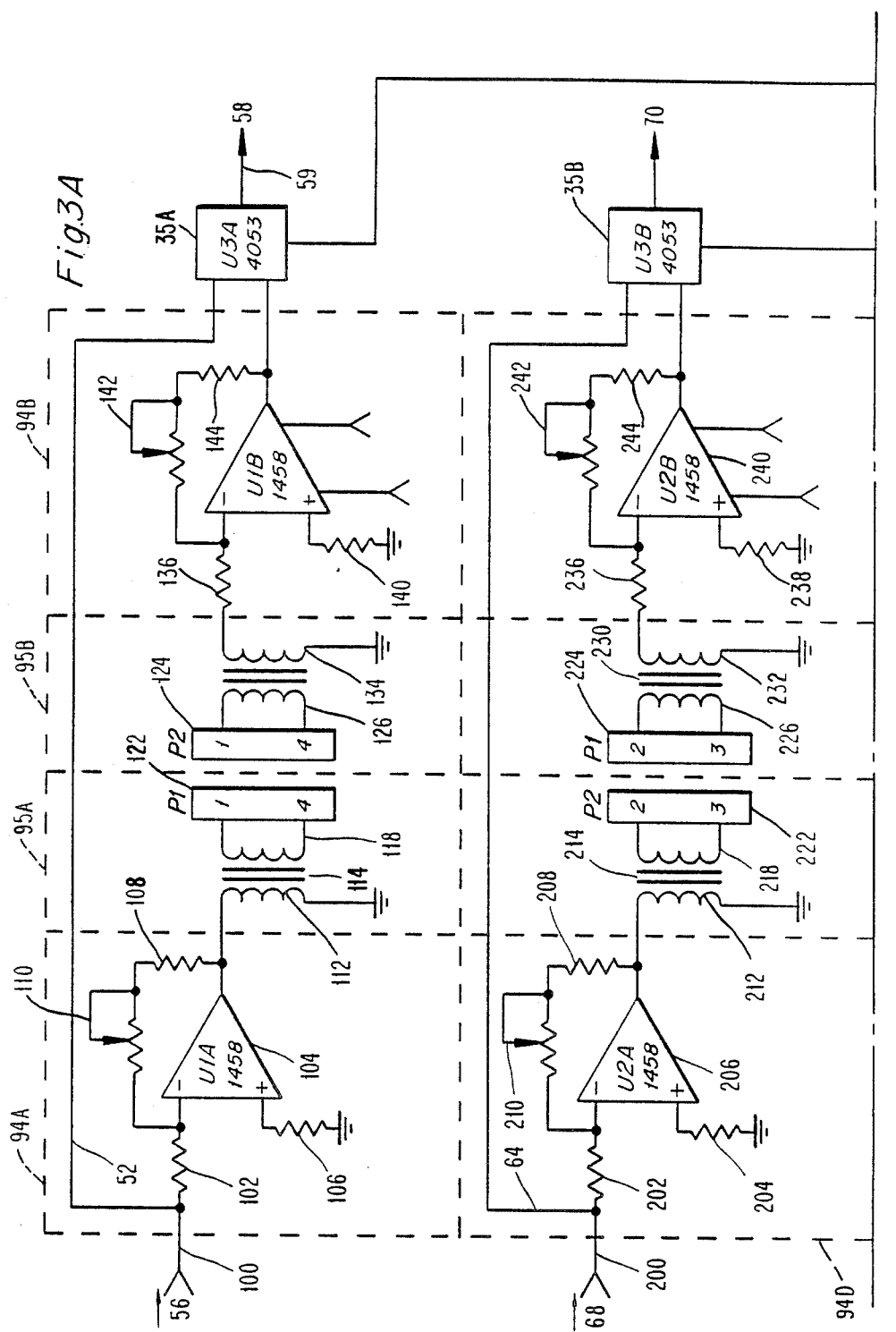
FIGS. 3A and 3B are electrical schematic diagram of bypass and interface circuitry of the apparatus shown in FIG. 2.
Figure 3B:
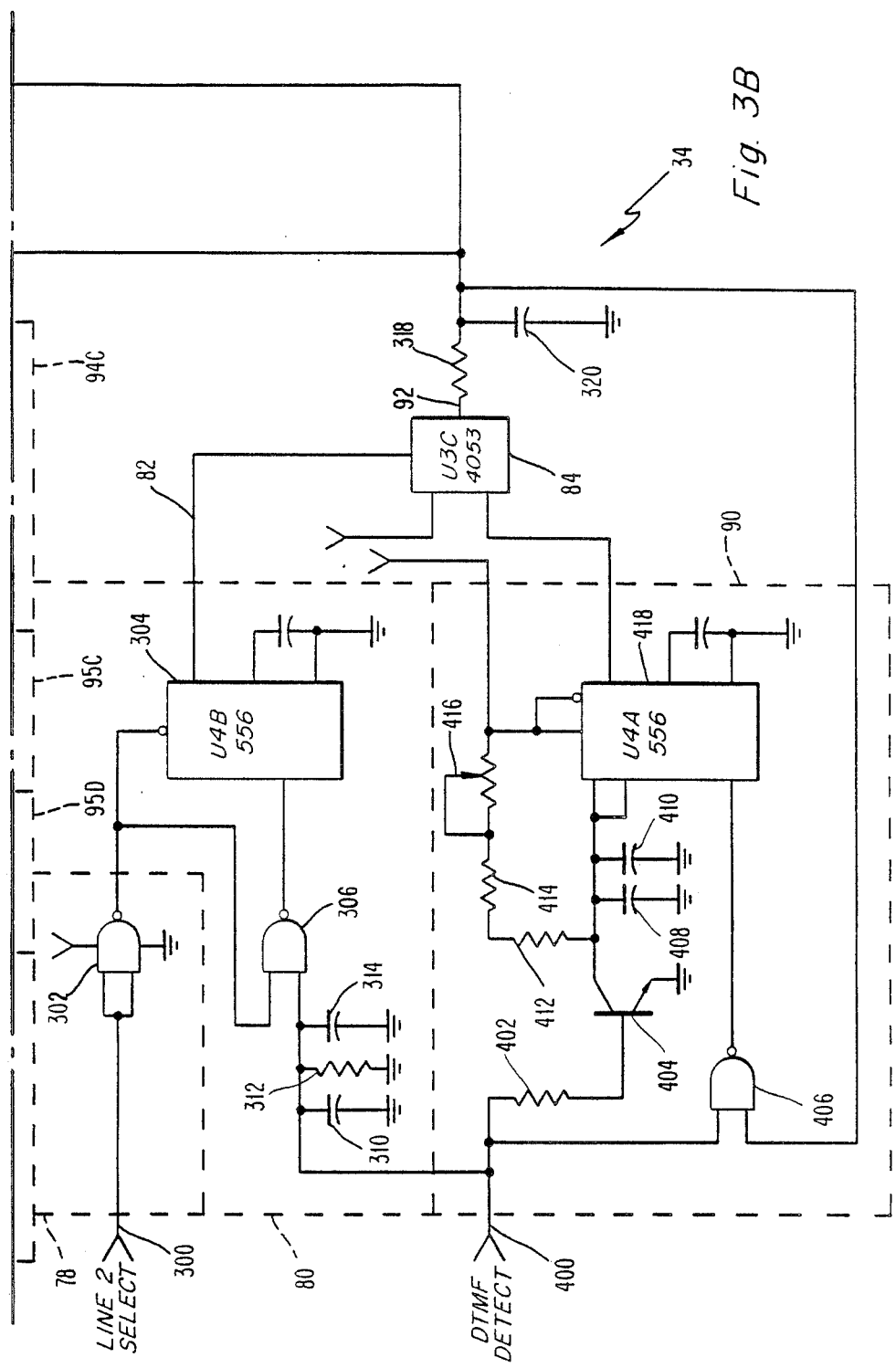

Referring now to FIGS. 3A and 3B, there is shown detailed schematic diagrams of bypass interface circuit 34. An input terminal 100 of level adjust amplifier 94A is connected to terminal 56 of call diverter 30 and receives signal line 52 from amplifier 54 of call diverter 30. Input terminal 100 is connected to one terminal of a resistor 102, the other end of which is connected to the inverting terminal of an operational amplifier 104. The non-inverting terminal of operational amplifier 104 is connected to one terminal of a resistor 106, the other terminal of which is connected to circuit common. The purpose of resistor 106 is to balance the input of operational amplifier 104. The purpose of resistor 102 is to set the input resistance for operational amplifier 104 which determines the gain of amplifier 94A. The output of operational amplifier 104 is connected through a feedback resistor 108 to one terminal of a variable resistor 110. The other terminal of variable resistor 110 is connected to the inverting terminal of operational amplifier 104. The purpose of variable resistor 110 is to adjust the gain of operational amplifier 104 for proper signal conditioning between the call diverter 30 and scrambler/descrambler unit 32. Operational amplifier 104 may comprise one half of a type MC1458, commercially available from the Signetics Corporation.

The output of operational amplifier 104 is also connected to one terminal of a primary winding 112 on a transformer 114 which is included in interface circuit 95A. The other terminal of primary winding 112 is connected to circuit common. Transformer 114 has a secondary winding 118 which is connected to a handset microphone connector 122. Transformer 114 is a 500 ohm to 500 ohm impedance matching transformer used for interfacing bypass interface circuit 34 to scrambler/descrambler unit 32. Handset microphone connector 122 provides the input to scrambler/descrambler unit 32 from bypass interface circuit.

The output of scrambler/descrambler unit 32 is supplied back to control bypass circuit 34 through a phoneset transmit connector 124 to the primary winding 126 of a transformer 130. Transformer 130 is a 1000 ohm to 1000 ohm impedance matching transformer used for interfacing scrambler/descrambler unit 32 to control bypass circuit 34 circuit. Transformer 130 has a secondary winding 134 one side of which is connected to circuit common while the other side is connected to one terminal of a resistor 136. The other terminal of resistor 136 is connected to the inverting terminal of an operational amplifier 138. The non-inverting terminal of operational amplifier 138 is connected to one terminal of a resistor 140, the other terminal of which is connected to circuit common. The purpose of resistor 140 is to balance the input of operational amplifier 138. The purpose of resistor 136 is to set the input resistance for operational amplifier 138 which determines the gain of amplifier circuit 94B. The output of operational amplifier 138 is connected through a feedback resistor 144 to one terminal of a variable resistor 142. The other terminal of variable resistor 142 is connected to the inverting terminal of operational amplifier 138. The purpose of variable resistor 142 is to adjust the gain of operational amplifier 138 for proper signal conditioning between call diverter 30 and scrambler/descrambler unit 32. Operational amplifier 138 may comprise one half of a type MC1458, commercially available from the Signetics Corporation.

The output of operational amplifier 138 is also connected to the "B" selected terminal of analog multiplexer 35A. The "A" selected terminal of multiplexer 35A is connected to input terminal 100. The common terminal of multiplexer 35A is connected through Line L2 MIC signal line 59 to terminal 58 of call diverter 30. The purpose of multiplexer 35A is to bypass scrambler/descrambler unit 32 during the generation of DTMF dialing tones. Multiplexer 35A may comprise one third of a type HEF4053B analog multiplexer, commercially available from the Signetics Corporation.

An input terminal 200 of amplifier 94D is connected to terminal 68 of call diverter 30 and receives a signal over line 64 from amplifier 66 of call diverter 30. Input terminal 200 is connected to one terminal of a resistor 202, the other terminal of which is connected to the inverting terminal of an operational amplifier 206. The non-inverting terminal of operational amplifier 206 is connected to one terminal of a resistor 204, the other terminal of which is connected to circuit common. The purpose of resistor 204 is to balance the input of operational amplifier 206. The purpose of resistor 202 is to set the input resistance of operational amplifier 206 which determines the gain of the amplifier 94D. The output of operational amplifier 206 is connected through a feedback resistor 208 to one terminal of a variable resistor 210. The other terminal of variable resistor 210 is connected to the inverting terminal of operational amplifier 206. The purpose of variable resistor 210 is to adjust the gain of operational amplifier 206 for proper signal conditioning between call diverter 30 and scrambler/descrambler unit 32. Operational amplifier 206 may comprise one half of a type MC1458 amplifier circuit, commercially available from the Signetics Corporation.

The output of operational amplifier 206 is also connected to one terminal of a primary winding 212 of a transformer 214. The other terminal of primary winding 212 is connected to circuit common. Transformer 214 has a secondary winding 218 which is connected to a phoneset receive connector 222. Transformer 214 is a 500 ohm to 500 ohm impedance matching transformer used for interfacing control bypass circuit 34 to scrambler/descrambler unit 32. Phoneset receive connector 222 provides an input to scrambler/descrambler unit 32 from control bypass circuit 34.

The output of scrambler/descrambler unit 32 is supplied back to control bypass circuit 34 through a handset earphone connector 224 of interface circuit 95C to a primary winding 226 of a transformer 230. Transformer 230 is a 1000 ohm to 1000 ohm impedance matching transformer used for interfacing the scrambler/descrambler unit to the control bypass circuit 34 Kernel circuitry. Transformer 230 has a secondary winding 232 of which one side is connected to circuit common while the other side is connected to one terminal of resistor 236. The other terminal of resistor 236 is connected to the inverting terminal of an operational amplifier 240 which forms part of amplifier 94C. The non-inverting terminal of operational amplifier 240 is connected to one terminal of resistor 238, the other terminal of which is connected to circuit common. The purpose of resistor 238 is to balance the input of operational amplifier 240. The purpose of resistor 236 is to set the input resistance for operational amplifier 240 which determines the gain of the amplifier circuit.

The output of operational amplifier 240 is connected through a feedback resistor 244 to one terminal of a variable resistor 242. The other terminal of variable resistor 242 is connected to the inverting terminal of operational amplifier 240. The purpose of variable resistor 242 is to adjust the gain of operational amplifier 240 for proper signal conditioning between the call diverter 30 and scrambler/descrambler unit 32. Operational amplifier 240 may comprise one half of a type MC1458 amplifier circuit, commercially available from the Signetics Corporation.

The output of operational amplifier 240 is also connected to the "B" selected terminal of multiplexer 35B. The "A" selected terminal of multiplexer 35B is connected to input terminal 200. The output of multiplexer 35B is connected through terminal 70 back to call diverter 30. The purpose of multiplexer 35B is to bypass the scrambler/descrambler unit during the generation of DTMF dialing tones. Multiplexer 35B comprise one third of a type HEF4053B multiplexer circuit, commercially available from the Signetics Corporation.

An input terminal 300 receives the LINE L2 SELECT signal 62 from terminal 68 of call diverter 30. Input terminal 300 is connected to both input terminals of a two-input NAND gate 302. NAND gate 302 is configured as an invertor 78 for the purpose of conditioning the LINE L2 SELECT signal. NAND gate 302 may comprise one fourth of a type 7400 logic circuit, commercially available from the Signetics Corporation. The output of NAND gate 302 is connected to the reset terminal of a timer 304 configured as latch circuit 80. The output of NAND gate 302 is also connected to one input terminal of NAND gate 306. The purpose of this connection is to selectively enable NAND gate 306. Timer 304 may comprise one half of a type SA556 timer circuit, commercially available from the Signetics Corporation.

An input terminal 400 receives DTMF DETECT signal 76 from call diverter 30. Input terminal 400 is connected to the second input terminal of NAND gate 306, to one terminal of a capacitor 310, to a resistor 312, and to a capacitor 314. The other terminals of capacitor 310, resistor 312, and capacitor 314 are connected to circuit common. Capacitor 310, resistor 312, and capacitor 314 are provided for conditioning of DTMF DETECT signal 76. The output of NAND gate 306 is connected to the trigger input of timer 304. Timer 304 operates as a set-reset flip flop, with the timer reset line acting as the reset for the flip flop and the timer trigger line acting as the set for the flip flop. Due to the configuration of timer 304, timer 304 will henceforth be referred to as "flip flop 304". The output of flip flop 304 is connected to the A/B select terminal of multiplexer 84. The purpose of flip flop 304 is to control which of the two inputs to multiplexer 84 is supplied to the output of the multiplexer. When LINE L2 SELECT becomes active, it removes the reset signal on flip flop 304 and also enables NAND gate 306. Once NAND gate 306 is enabled, the next DTMF DETECT signal, supplied by call diverter 30, sets flip flop 304 and changes its output state to a logic high.

Input terminal 400 is also connected to one terminal of a resistor 402 in scrambler disable one-shot circuit 90. The other terminal of resistor 402 is connected to the base terminal of a transistor 404. The emitter terminal of transistor 404 is connected to circuit common. The collector of transistor 404 is connected to one terminal of capacitors 408 and 410. Transistor 404 collector is also connected to the threshold and discharge terminals of a timer 418. The other terminals of capacitors 400 and 410 are connected to circuit common. The purpose of transistor 404 is to discharge capacitors 408 and 410 to circuit common each time the DTMF DETECT control signal is active. Transistor 404 may be a type 2N3904, commercially available from Motorola Incorporated. The collector of transistor 404 is also connected through resistors 412 and 414 to one terminal of variable resistor 416. The other terminal of a variable resistor 416 is connected to the reset line of timer 418 and to the circuit power supply (+5 volts).

Input terminal 400 is also connected to one terminal of a NAND gate 406, the output terminal of which is connected to the trigger input terminal of a timer 418. Timer 418 is configured as a one-shot pulse generator, where the pulse width is determined by resistors 416 and 414, variable resistor 412, and capacitors 408 and 410. A pulse is initiated at the output of timer 418 when a signal is applied to the trigger input terminal by NAND gate 406. The output pulse remains at a logic high state until capacitors 408 and 410 charge up to a voltage level equal to the internal threshold level of timer 418 as measured at the threshold terminal of the timer. The output of timer 418, however, will remain at a logic high state as long as DTMF DETECT signal 76 remains active, which discharges capacitors 408 and 410 via transistor 404, before the charge on capacitors 408 and 410 reaches that of the timer threshold level. Timer 418 may comprise one half of a type SA556 timer circuit, commercially available from the Signetics Corporation.

The output of timer 418 is connected to the "A" selected terminal of multiplexer 84. The "B" selected terminal of multiplexer 84 is connected to the circuit power supply which holds the "B" terminal at a logic high state.

The output of multiplexer 84 is connected through a resistor 318 to one terminal of a capacitor 320. This terminal of capacitor 320 is also connected to the second input terminal of NAND gate 406, and the A/B select control terminals of multiplexers 35A and 35B. The other terminal of capacitor 320 is connected to circuit common. Multiplexer 84 provides the A/B select control signals for multiplexers 35A and 35B and provides feedback to disable the trigger input to timer 418 by disabling the signal flow through NAND gate 406. The signal at the output of multiplexer 84 is supplied through the pulse stretching network comprised of resistor 318 and capacitor 320. Multiplexer 84 may comprise one third of a type HEF4053B multiplexer circuit, commercially available from the Signetics Corporation.

When LINE L2 SELECT control signal 62 becomes active, the reset signal is removed from flip flop 304 and NAND gate 306 is enabled. The output of flip flop 304 will remain at a logic low state however until DTMF DETECT signal 76 goes active, which will set the flip flop output to a logic high state. When flip flop 304 goes high, it sets the control signal on multiplexer 84 such that input "A" is now supplied to the output of multiplexer 84. DTMF DETECT signal 76 also discharges capacitors 408 and 410, via transistor 404, while triggering one-shot timer 418. This causes the output of timer 418 to go to a logic high state which is supplied to input "A" of multiplexer 84. This logic high state is fed to the output of multiplexer 84 and to the A/B select terminals of multiplexers 35A and 35B, thereby bypassing scrambler/descrambler unit 32 and isolating it from the communications path. Circuit 34 will remain in this mode as long as a new DTMF DETECT signal is supplied to circuit 34 by call diverter 30 before capacitors 408 and 410 charge up to the internal threshold of timer 418.

Once capacitors 408 and 410 are allowed to charge up to the threshold level of timer 418, the timer output will switch to a logic low state which is supplied through multiplexer 84 to the A/B select terminals of multiplexers 35A and 35B. This logic low state causes multiplexers 35A and 35B to switch scrambler/descrambler unit 32 in series with the communications path. This logic low signal is also fed back to NAND gate 406 to disable the trigger input of timer 418 so that additional DTMF DETECT signals will not retrigger timer 418. Timer 418 will remain disabled until LINE L2 SELECT control line 62 is reset from within call diverter 30.

The operation of circuit 34 is such as to cause scrambler/descrambler 32 to be isolated from the communications path before line L2 is placed off-hook, since LINE L2 SELECT signal 62 inverted by inverter 78 maintains latch 80 in a reset condition. After line L2 is placed off-hook, a reset signal is no longer supplied to latch 80, but the output of latch 80 remains high since no set signal has yet been received.

The reception of a DTMF signal over line L1 as indicated by DTMF DETECT signal 76 sets latch 80 to cause multiplexer 84 to connect the output of one-shot circuit 90 to the output of multiplexer 84. However, scrambler/descrambler 32 remains isolated since one-shot circuit 90 maintains a logic high signal on line 88 upon the detection of each DTMF signal and for ten seconds thereafter. After the expiration of the ten second period, one-shot circuit 90 supplies a logic low signal through multiplexer 84 to connect scrambler/descrambler 32 in series with the communications path. The logic low signal on the output of multiplexer 84 is fed back to the trigger enable input of one-shot circuit 90 to prevent the detection of a subsequent DTMF signal over the communications path from inadvertently disconnecting scrambler/descrambler 32.

Figure 4:
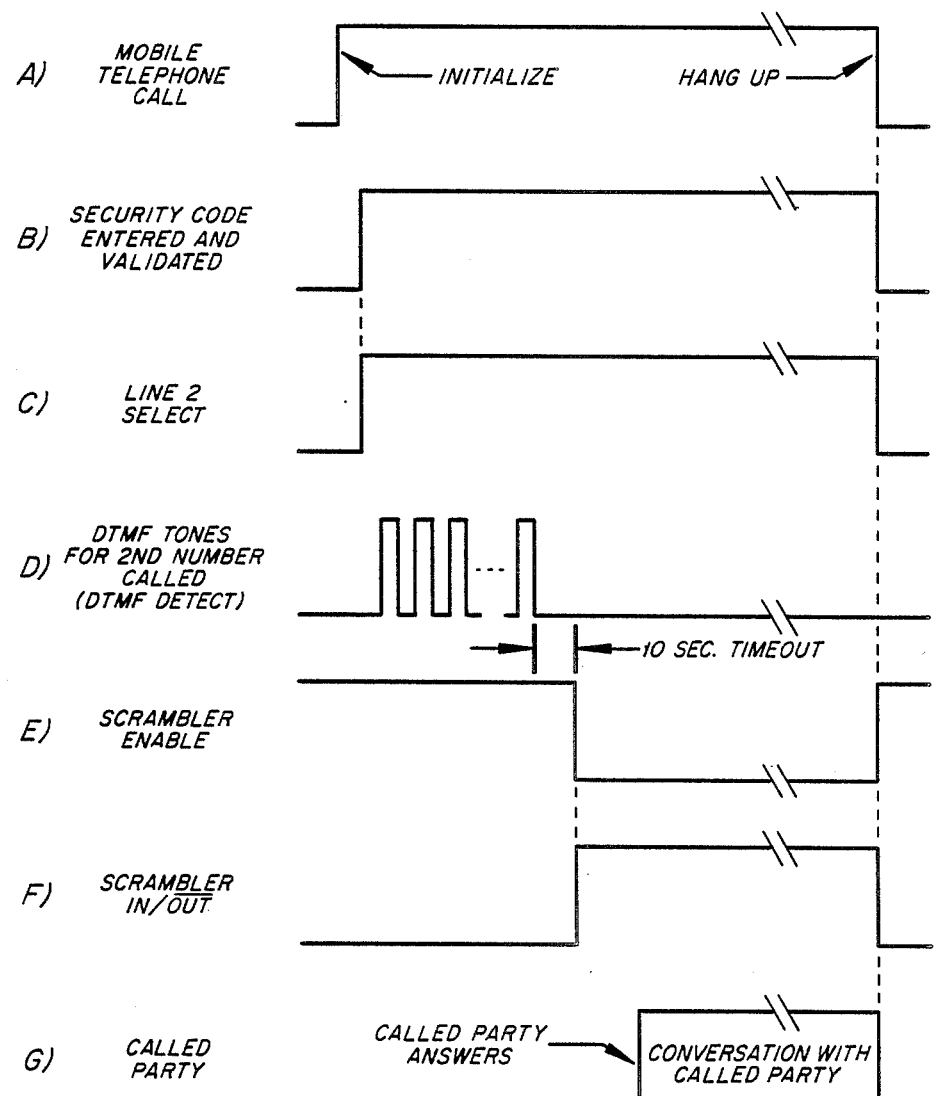
FIG. 4 is a system timing diagram showing the relationship of various signals and activities in the system of FIG. 1.

Referring now to FIGS. 4A-4G, timing signals of the operation of various components of system 0 are shown. FIG. 4A "MOBILE TELEPHONE CALL" shows the duration of an actual telephone call on system 10. This signal corresponds to the off-hook condition of cellular telephone 12. The rising edge (INITIALIZE) represents the start of the call, and the falling edge (HANG UP) represents the end of the call.

FIG. 4B "SECURITY CODE ENTERED AND VALIDATED" represents the time from when the optional access code is entered, to the time the call is complete. This figure does not correspond to a specific signal in FIGS. 1, 2A, 2B, 3A, or 3B.

The signal "LINE L2 SELECT" of FIG. 4C corresponds to signal 62 in FIGS. 2A and 2B and represents the time that line L2 is connected to hybrid 60 through relay S4.

The signal "DTMF DETECT" of FIG. 4D corresponds to DTMF DETECT signal 76 in FIGS. 2A and 2B. This signal is active each time the caller enters a DTMF tone to dial the called party.

The signal "SCRAMBLER ENABLE" of FIG. 4E corresponds to the SCRAMBLER ENABLE signal 92 in FIGS. 2 and 3, and is an "active low" signal. This line becomes active ten seconds after DTMF DETECT has pulsed high. If DTMF DETECT pulses high again before the ten seconds are over, then the timing sequence starts over. SCRAMBLER ENABLE line 92 will go high again when the call is completed.

The signal "SCRAMBLER IN/OUT" of FIG. 4F represents the condition of scrambler 32 as a result of SCRAMBLER ENABLE line 92. Scrambler 32 is connected in series with the communications path when this signal is high.

The signal "CALLED PARTY" of FIG. 4G represents the period of time that the called party is connected to base module 28. This signal does not correspond to any specific signal in the figures. The rising edge of FIG. 4G represents the time when the called party answers, and the falling edge represents the time when either the called party or calling party hangs up.

As described above, scrambler/descrambler 32 is engaged after a time delay following a received DTMF signal. Alternatively, scrambler/descrambler 32 could be engaged in response to a command code requested from either party by a request tone generated by diverter control circuit 44. After the request tone is generated, either party may generate a command code consisting of DTMF signals. If the DTMF signals received by diverter control circuit 44 match a stored command code, diverter control circuit 44 activates SCRAMBLER ENABLE signal 92, as shown in dotted lines in FIG. 2.

Although the embodiment of FIGS. 1-4 has been discussed with regard to cellular telephone systems, the invention is not so limited. Privacy of communication may be provided for other radiotelephone systems such as IMTS (Improved Mobile Telephone System), Marine Radiotelephone Service, etc. For example, a standard VHF-FM marine radiotelephone transmitter/receiver unit may be used wherein a scrambler/descrambler unit 32 is interfaced to the existing marine radiotelephone speaker and microphone jacks. In addition, a standard portable DTMF handheld generator (Radio Shack Model 43-138 or equivalent) or DTMF-equipped microphone is used for dialing through the system to the called party telephone, since standard DTMF signaling is not normally provided in the marine radiotelephone service.

In this application, the mobile user contacts the radiotelephone base station or marine radiotelephone operator and is connected through to base module 28 and call diverter 30 through normal procedures to interface to the public switched telephone network. The portable DTMF generator is used to dial the called party through the base module 28. After the connection is established between the mobile user and the called party, the mobile user switches in both the land-based and mobile scrambling equipment. Thus, secure communication is established between the mobile user and the land-based called party. Again, the invention provides the ability to establish private communications over radiotelephone links while not requiring that the called party be equipped with any equipment other than a standard telephone. Private ship-to-shore and mobile radiotelephone communications can then occur.

Figure 5:
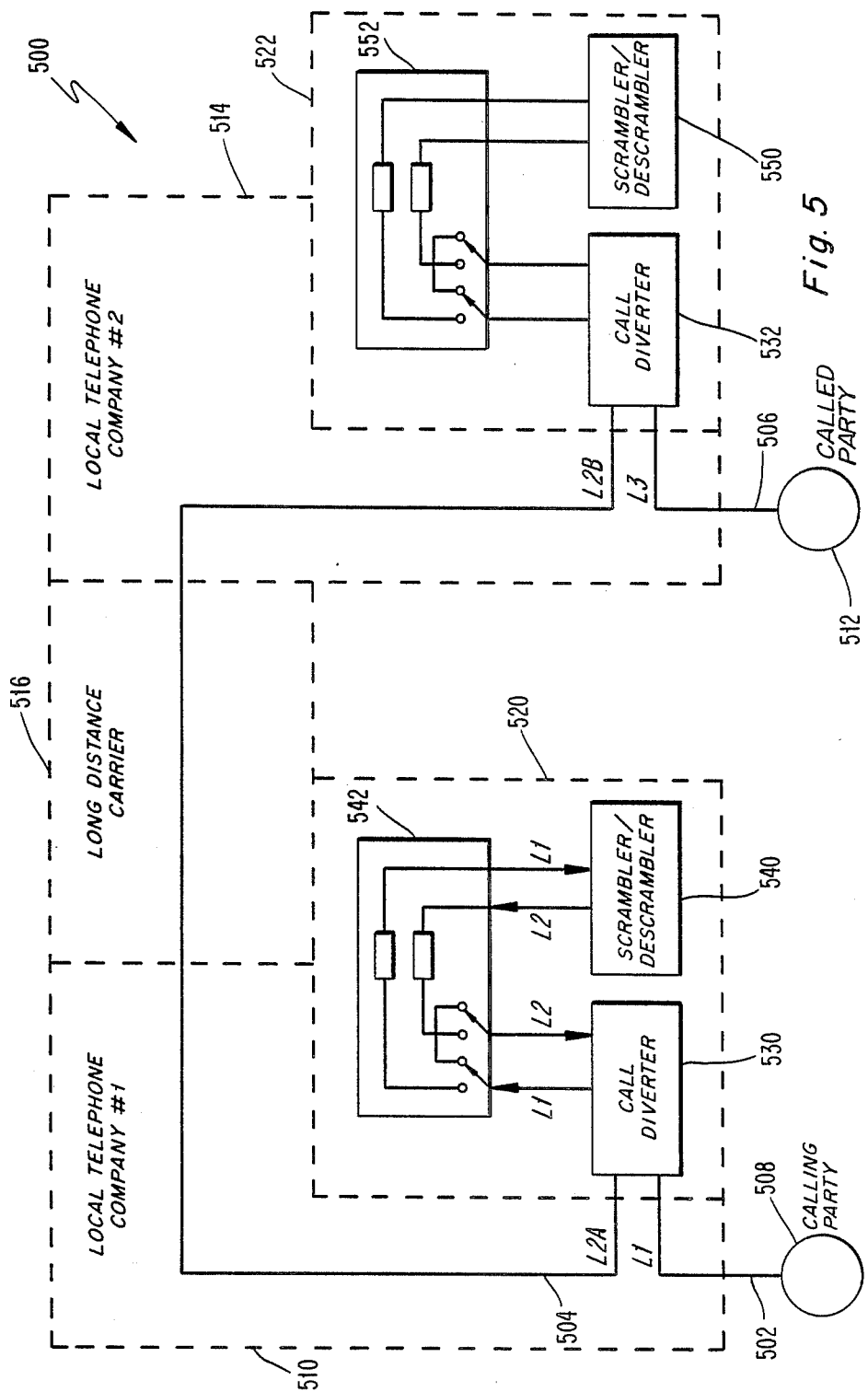
FIG. 5 is a block diagram of a second preferred embodiment of the present invention.

FIG. 5 shows an alternative embodiment of the invention. A communications system 500 includes first, second, and third communications channels 502, 504, and 506. A calling party 508 is located in a first geographic region 510 served by a first local telephone company. A called party 512 is located in a second geographic region 514 served by a second local telephone company. Calling party 508 and called party 512 may each represent a plurality of calling and called parties, respectively. For example, a corporation may have a number of employees located in the Washington, D.C. area which, in the normal course of business, must communicate by telephone with a large number of fellow employees located in the San Francisco area.

The facilities of the first and second local telephone companies are interconnected through the facilities 516 of a long distance carrier. Facilities 516 include radio links such as satellite communications circuits and terrestrial microwave links.

Under normal conditions using only the facilities of the first and second local companies and of the long distance carrier, the privacy of a conversation between calling party 508 and called party 512 can not be insured. Moreover, using prior art methods and apparatus to provide such privacy, each calling party in Washington and each called party in San Francisco must be connected to a separate scrambler/descrambler unit.

In the embodiment of the invention shown in FIG. 5, privacy of communication is provided with significantly less cost and complexity than prior art methods and apparatus. First and second base modules 520 and 522 identical to base module 28, are respectively located in regions 510 and 514 at facilities owned or controlled by the user. Base modules 520 and 522 each include a call diverter 530/532, a bypass interface circuit 542/552, and a scrambler/descrambler unit 540/550, as shown in FIG. 5. Base module 520 is connected to two standard telephone lines L1 and L2A provided by the local telephone company serving region 510. Lines L1 and L2A each have a separate telephone number assigned thereto, with an area code appropriate for geographic region 510.

In the embodiment of FIG. 5, the invention includes first diverter means for establishing a communications path between first and second channels in response to signals received over one of the first and second channels. As embodied herein, the first diverter means comprises call diverter 530. The invention also includes second diverter means for establishing a communications path between second and third channels in response to signals received over one of the second and third channels. As embodied herein, the second diverter means comprises call diverter 532 located in base module 522.

The invention further includes first and second encryption means each having first and second terminals for encrypting signals received from the second terminal and supplying the encrypted signals to the first terminal, and for decrypting signals received from the first terminal and supplying the decrypted signals to the second terminal. As embodied herein, the first and second encryption means comprise scrambler/descrambler units 540 and 550.

The invention also includes first coupling means responsive to an activation signal for selectively connecting the first encryption means to the first diverter means such that the first encryption means first terminal is connected to the first channel and the first encryption means second terminal is connected to the second channel. As embodied herein, the first coupling means comprises bypass interface circuit 542.

The invention further includes second coupling means responsive to an activation signal for selectively connecting the second encryption means to the second diverter means such that the second encryption means second terminal is connected to the third channel and the second encryption means first terminal is connected to the second channel.

Calling party 508 and called party 512 may be any telephone, fixed or mobile, located anywhere in the world and associated with the public switched telephone network. In the embodiment shown in FIG. 5, it is assumed that, except for the portion of the communications path provided by the facilities 516 of the long distance carrier, privacy in the communications path between calling party 508 and called party 512 is ensured by other means. Thus, for simplicity of explanation, calling party 508 is assumed to be a fixed telephone in geographic region 510 and called party 512 is assumed to be a fixed telephone located in geographic region 514.

Calling party 508 initiates the telephone call by calling the telephone number assigned to line L1 of base module 520. Call diverter 530 receives a first activation signal over line L1 consisting of a standard ringing signal. Call diverter 530 places line L1 in an off-hook condition and receives signals over line L1 in response to the ringing signal. Call diverter 530 then establishes a communications path between lines L1, L2A, L2B, and L3 by placing line L2A in an off-hook condition to supply a dial tone to calling party 508. Calling party 508 then dials the telephone number associated with line L2B of call diverter 532 in region 514. Call diverter 532 places lines L2B and L3 in an off-hook condition, causing a dial tone to be supplied by the second local telephone company over line L3 to base module 522, over line L2B and L2A through base module 520 to line L1 and ultimately to calling party 508.

Calling party 508 then dials the telephone number of called party 512. When called party 512 answers, a communications path is established between calling party 508 and called party 512 over lines L1, L2A, L2B and L3 in response to signals received over line L1. Encryption/decryption circuits, such as scrambler/descrambler units 540/550, are then inserted in series in the communications path between lines L1 and L2A, and between lines L2B and L3, by base modules 520 and 522, respectively. Such insertion may be done in response to an access code generated by calling party 508 or in response to dialing signals produced by calling party 508. Calling party 508 then converses in a normal manner, producing signals which are received over line L1 by module 520, are encrypted by scrambler/descrambler unit 540, and retransmitted over line L2A. Signals passing through the facilities 516 of the long distance carrier, which may include radio links, are thus encrypted to insure privacy of communication. The encrypted signals received by module 522 over line L2B are then decrypted by scrambler/descrambler unit 550. The decrypted signals originally received from line L1 are then retransmitted by module 522 over line L3.

In a similar manner, signals received from called party 512 over line L3 by module 522 are encrypted by scrambler/descrambler unit 550 and retransmitted over line L2B and L2A to module 520. The signals originally received over line L3 are then decrypted by scrambler/descrambler unit 540 and retransmitted over line L1 in decrypted form to calling party 508. Thus, neither calling party 508 nor called party 512 requires a scrambler/descrambler unit at its location. Nevertheless, communications signals passing through facilities of long distance carrier 516, which are susceptible to unauthorized monitoring, are conducted only in encrypted form, thus assuring privacy for calling party 508 and called party 512.

The functions of calling party 508 and called party 512 may be reversed, with modules 520 and 522 performing functions reciprocal to those described above.

In the embodiments discussed above with regard to FIGS. 1-5, the frequency inverting scrambler/descrambler units employed are moderate in cost and provide an acceptable level of privacy for many applications. For communication of highly sensitive information, it is sometimes desirable to provide an increased level of security through a more elaborate encryption scheme than that provided by readily available commercial scrambler/descrambler units, such as the frequency inverting Cellular One model 1905 scrambler/descrambler units. The invention, in another aspect, thus includes input and output means for supplying signals to an associated encryption/decryption device and for receiving signals from the associated encryption/decryption device; and bypass means responsive to an activation signal for switching between a connected condition in which the input and output means are connected in series circuit relationship with the communications path and a bypass condition in which the input and output means is isolated from the communications path. As embodied herein, the input and output means comprises interface circuits 95A-95D, and the bypass means comprises multiplexers 35A and 35B.

The present invention permits the use of any type of encryption/decryption unit in place of scrambler/descrambler unit 32. Such substitution can be simply provided with a one-for-one replacement of scrambler/descrambler 32 by any four-terminal encryption/decryption unit such as a Transcrypt International model SC-450 encryption/decryption unit or a custom high security encryption/decryption unit. With the apparatus and methods described herein, sophisticated encryption/decryption capability can be provided for those applications requiring it, without imposing the high cost of such sophisticated devices on other users for whom such increased levels of security are not economically justified.

It will be apparent to those skilled in the art that various modifications and variations can be made in the communications system privacy apparatus and methods of this invention without departing from the spirit or scope of the invention. The present invention covers such modifications and variations which are within the scope of the appended claims and their equivalents.

We claim:

1. Communications system security apparatus adapted for coupling to first and second communications channels each comprising public subscriber lines having first and second ends, said first ends being at a network switch, said apparatus comprising:

diverter means for establishing an unencrypted communications path between said second ends of said first and second channels in response to signals received over said channels;

encryption means having first and second terminals for encrypting signals received at said second terminal and supplying said encrypted signals to said first terminal, and for decrypting signals received at said first terminal and supplying said decrypted signals to said second terminal; and coupling means responsive to an activation signal for selectively coupling said encryption means to said diverter means such that said first terminal is coupled to said first channel second end and said second terminal is coupled to said second channel second end, whereby encrypted signals received at said first channel second end are transmitted in decrypted form over said second channel and signals received at said second channel second end are transmitted over said first channel in encrypted form.

2. Apparatus as recited in claim 1 wherein said coupling means is operable between a first mode in which said encryption means is isolated from said communications path and a second mode in which said encryption means is connected in series with said communications path.

3. Apparatus as recited in claim 2 wherein said diverter means comprises DTMF detection means for generating a DTMF DETECT signal in response to the presence of DTMF signals on said communications path and wherein said coupling means comprises means responsive to said DTMF detect signal for maintaining said coupling means in said first mode during the presence of DTMF signals on said communications path.

4. Apparatus as recited in claim 3 wherein said maintaining means comprises a multiplexer circuit having a common terminal, a select terminal, and a pair of selected terminals, a latch circuit connected to the select terminal of said multiplexer circuit, and a timer circuit connected to one of said selected terminals of said multiplexer circuit.

5. Apparatus as recited in claim 4 wherein said timer circuit includes means for causing said multiplexer circuit to switch said coupling means to said second mode a predetermined time after detection of a DTMF signal on said communications path.

6. Apparatus as recited in claim 1 wherein said diverter means comprises means responsive to an access code received over said first communications channels to establish a communications path between said first and second channels.

7. Apparatus as recited in claim 1 wherein said diverter means comprises a pair of relays, a pair of hybrid circuits, and a diverter control circuit operative to establish said communications path through said relays and said hybrid circuits.

8. Apparatus as recited in claim 7 wherein said coupling means is connected between said hybrid circuits.

9. Apparatus as recited in claim 8, wherein said diverter means comprises a pair of ring detector circuits each respectively connected to one of said channels and each generating a ring detect signal when a ringing signal is present on the respective channel.

10. Apparatus as recited in claim 9 wherein said diverter control circuit is responsive to said ring detect signals to establish said communications path through said relays and said hybrid circuits to permit DTMF signals received from either of said channels to be transmitted over the other of said channels.

11. Apparatus as recited in claim 10 wherein said diverter means comprises means responsive to a ring detect signal associated with one of said channels to transmit a predetermined sequence of DTMF signals over the other of said channels.

12. A method for providing privacy in a communications system having first and second channels, each of said channels comprising public subscriber lines having first and second ends, said first end being at a public network switch, said method comprising the steps of:

receiving a first activation signal over at least one of said first and second channels;

accepting communications signals and encrypted communications signals from at least one of said first and second channel second ends in response to said first activation signal;

establishing an unencrypted communications path between said first channel second end and said second channel second end in response to communications signals received at at least one of said first and second channel second ends;

selectively inserting an encryption/decryption circuit in said communications path in response to said received communications signals; and decrypting said encrypted communications signals received at said first channel second end to form decrypted signals and transmitting said decrypted signals over said second channel, and encrypting communications signals received over said second channel second end and transmitting said encrypted second channel signals over said first channel.

13. A method as recited in claim 12 wherein said step of selectively inserting an encryption/decryption circuit comprises the substeps of detecting DTMF signals on said communications path, maintaining said encryption/decryption circuit in isolation from said communications path when said DTMF signals are present on said communications path, and inserting said encryption/decryption circuit in series with said communications path after said DTMF signals are no longer present.

14. A method as recited in claim 13 wherein said substep of maintaining said encryption/decryption circuit in isolation comprises the substep of maintaining said encryption/decryption circuit in isolation from said communications path for a predetermined time period after said DTMF signals are no longer present on said communications path.

15. Communications system security apparatus adapted for coupling to first, second, and third communications channels, said apparatus comprising:

first diverter means for establishing a communications path between said first and second channels in response to signals received over one of said first and second channels;

second diverter means for establishing a communications path between said second and third channels in response to signals received over one of said second and third channels;

first and second encryption means each having first and second terminals for encrypting signals received from said second terminal and supplying said encrypted signals to said first terminal, and for decrypting signals received from said first terminal and supplying said decrypted signals to said second terminal;

first coupling means responsive to an activation signal for selectively connecting said first encryption means to said first diverter means such that said first encryption means first terminal is connected to said first channel and said first encryption means second terminal is connected to said second channel; and second coupling means responsive to an activation signal for selectively connecting said second encryption means to said second diverter means such that said second encryption means second terminal is connected to said third channel and said second encryption means first terminal is connected to said second channel;

whereby signals received by said apparatus from said first channel are transmitted in encrypted form over said second channel and retransmitted in decrypted form over said third channel, and whereby signals received by said apparatus from said third channel are transmitted in encrypted form over said second channel and retransmitted in decrypted form over said first channel.

16. A method for providing privacy in a communications system having first, second, and third channels, said method comprising the steps of:

receiving a first activation signal over one of said first and third channels;

accepting communications signals from said one channel in response to said first activation signal;

establishing a communications path between said first, second, and third channels in response to communications signals received over said one channel;

selectively inserting an encryption/decryption circuit in said communications path between said first and second channels and between said second and third channels in response to communications signals received over said channels;

encrypting said communications signals received over said first channel to form encrypted first channel communications signals, retransmitting said encrypted first channel communications signals over said second channel, decrypting said encrypted first channel communications signals received over said second channel, and retransmitting said decrypted first channel communications signals over said third Channel; and encrypting communications signals received over said third channel to form encrypted third channel signals, retransmitting said encrypted third channel signals over said second channel; decrypting said encrypted third channel communications signals received over said second channel, and retransmitting said decrypted third channel communications signals over said first channel.

17. Communications system security apparatus adapted for coupling to first and second communications channels, each comprising public subscriber lines having first and second ends, said first end being at a network switch said apparatus comprising:

diverter means for establishing an unencrypted communications path between said second ends of said first and second channels in response to signals received over said channels;

input and output means for supplying signals to an associated encryption/decryption device and for receiving signals from said associated encryption/decryption device; and bypass means responsive to an activation signal for switching between a connected condition in which said input and output means are connected in series circuit relationship with said communications path and a bypass condition in which said input and output means is isolated from said communications path.

18. Communications system security apparatus adapted for coupling to first, second, and third communications channels, said first and third channels having a first end at a public network switch and a second end at a location other than a public network switch, said apparatus comprising:

first diverter means for establishing a communications path between said first channel second end and said second channel in response to signals received over one of said first and second channels;

second diverter means for establishing a communications path between said second channel and said third channel second end in response to signals received over one of said second and third channels;

first and second encryption means each having first and second terminals for encrypting signals received from said second terminal and supplying said encrypted signals to said first terminal, and for decrypting signals received from said first terminal and supplying said decrypted signals to said second terminal;

first coupling means responsive to an activation signal for selectively connecting said first encryption means to said first diverter means such that said first encryption means first terminal is connected to said first channel second end and said first encryption means second terminal is connected to said second channel; and second coupling means responsive to an activation signal for selectively connecting said second encryption means to said second diverter means such that said second encryption means second terminal is connected to said third channel second end and said second encryption means first terminal is connected to said second channel;

whereby signals received by said apparatus from said first channel are transmitted in encrypted form over said second channel and retransmitted in decrypted form over said third channel, and whereby signals received by said apparatus from said third channel are transmitted in encrypted form over said second channel and retransmitted in decrypted form over said first channel.

19. A method for providing privacy in a communications system having first, second, and third channels, said first and third channels having a first end at a public network switch and a second end at a location other than a public network switch, said method comprising the steps of:

receiving a first activation signal over one of said first and third channels;

accepting communications signals from said one channel in response to said first activation signal;

establishing a communications path between said second end of said first channel and said second channel and between said second end of said third channel and said second channel in response to communications signals received over said one channel;

selectively inserting an encryption/decryption circuit in said communications path between said first channel second end and second channel and between said second channel and said third channel second end in response to communications signals received over said channels;

encrypting said communications signals received over said first channel to form encrypted first channel communications signals, retransmitting said encrypted first channel communications signals over said second channel, decrypting said encrypted first channel communications signals received over said second channel, and retransmitting said decrypted first channel communications signals over said third channel; and encrypting communications signals received over said third channel to form encrypted third channel signals, retransmitting said encrypted third channel signals over said second channel; decrypting said encrypted third channel communications signals received over said second channel, and retransmitting said decrypted third channel communications signals over said first channel.

20. Communications system security apparatus adapted for coupling to first and second communications channels each comprising public subscriber lines having first and second ends, said first ends being at a network switch, said apparatus comprising:

diverter means for establishing an unencrypted communications path between said first and second channels in response to signals received over said channels, said diverter means including first and second connection means for respectively connecting said diverter means to said second ends of said first and second channels;

encrypting means having first and second terminals for encrypting signals received at said second terminal and supplying said encrypted signals to said first terminal, and for decrypting signals received at said first terminal and supplying said decrypted signals to said second terminal; and coupling means responsive to an activation signal for selectively coupling said encryption means to said diverter means such that said first terminal is coupled to said first channel second end and said second terminal is coupled to said second channel second end, whereby encrypted signals received at said first channel second end are transmitted in decrypted form over said second channel and signals received at said second channel second end are transmitted over said first channel in encrypted form.

21. Communications system security apparatus adapted for coupling to first and second switched network telephone lines, said apparatus comprising:

diverter means for establishing an unencrypted communications path between said first and second switched network telephone lines in response to signals received over at least one of said switched network telephone lines, said diverter means including first and second connection means for respectively connecting said diverter means to said first and second switched network telephone lines;

encryption means having first and second terminals for encrypting signals received at said second terminal and supplying said encrypted signals to said first terminal, and for decrypting signals received at said first terminal and supplying said decrypted signals to said second terminal; and coupling means responsive to an activation signal for selectively coupling said encryption means to said diverter means such that said first terminal is coupled to said first switched network telephone line and said second terminal is coupled to said second switched network telephone line, whereby encrypted signals received over said first switched network telephone line are transmitted in decrypted form over said second switched network telephone line and signals received over said second switched network telephone line are transmitted over said first switched network telephone line in encrypted form.

22. A method for providing privacy in a communications system having first and second switched network telephone lines, said method comprising the steps of:

receiving a first activation signal over at least one of said first and second switched network telephone lines;

accepting communications signals and encrypted communications signals from said first switched network telephone line in response to said first activation signal;

establishing an unencrypted communications path between said first switched network telephone line and said second switched network telephone line in response to communications signals received over said first switched network telephone line;

selectively inserting an encryption/decryption circuit in said communications path in response to said communications signals received over at said first switched network telephone line; and decrypting said encrypted communications signals received over said first switched network telephone line to form decrypted signals and transmitting said decrypted signals over said second switched network telephone line, and encrypting communications signals received over said second channel second end and transmitting said encrypted second switched network telephone line signals over said first switched network telephone line.

* * * * *